United States Patent [19]

Rea et al.

[11] Patent Number: 5,105,674
[45] Date of Patent: Apr. 21, 1992

[54] CONSTANT-MESH, MULTIPLE-SHAFT TRANSMISSION

[75] Inventors: Jeffrey E. Rea, Schwetzingen, Fed. Rep. of Germany; Danni D. Mills, Anderson; John S. Sewell, Yorktown, both of Ind.

[73] Assignee: Borg-Warner Automotive Diversified Transmission Products Corporation, Sterling Heights, Mich.

[21] Appl. No.: 584,823

[22] Filed: Sep. 19, 1990

[51] Int. Cl.$^5$ ............................................. F16H 3/08
[52] U.S. Cl. ....................................... 74/333; 74/359; 74/473 R
[58] Field of Search ................. 74/331, 333, 339, 340, 74/342, 343, 359, 337.5, 335, 473 R, 360, 361; 192/48.1, 48.8

[56] References Cited

U.S. PATENT DOCUMENTS

| | | | |
|---|---|---|---|
| 3,618,416 | 11/1971 | Longshore | 74/333 |
| 3,994,182 | 11/1976 | Katayama | 74/375 R |
| 4,409,857 | 10/1983 | Lasoen | 74/359 X |
| 4,409,858 | 10/1983 | Lasoen | 74/359 X |
| 4,552,258 | 11/1985 | Sigg et al. | 192/48.8 X |
| 4,757,726 | 7/1988 | Yamaguchi et al. | 74/473 |
| 4,807,493 | 2/1989 | Loeffler | 74/333 X |
| 4,811,615 | 3/1989 | Rea | 74/375 |
| 4,817,451 | 4/1989 | Weismann | 74/333 |
| 4,922,767 | 5/1990 | Toshifumi | 74/333 |

Primary Examiner—Rodney H. Bonck
Assistant Examiner—Matthew Stavish
Attorney, Agent, or Firm—Brooks & Kushman

[57] ABSTRACT

A multiple-shaft transmission having multiple gear ratios, at least one ratio having a gearset with gear elements (58, 144, 204) that are journalled on their respective shafts (44, 112, 206) and that are continuously in mesh, each shaft carrying a clutch assembly (178, 188) that may be selectively engaged and disengaged to complete and to interrupt a torque flow path through the gearset whereby the gear elements are isolated from the input and output driven and do not contribute to the total inertia mass of the driven rotating components of the transmission when they do not form a part of the torque flow path, thus reducing gear rattle and reducing shift efforts required to effect gear ratio changes.

5 Claims, 9 Drawing Sheets

CONSTANT-MESH, MULTIPLE-SHAFT TRANSMISSION

BACKGROUND OF THE INVENTION

Our invention relates generally to parallel shaft transmissions for automotive vehicles, particularly multiple ratio transmissions having a mainshaft adapted to be driven by the vehicle engine crankshaft axis and a countershaft arranged in parallel disposition with respect to the mainshaft.

A typical transmission of this kind may include multiple gears of different pitch diameters journalled on the common axis of a torque input shaft and an output shaft. The gears engage companion gears mounted on the axis of a countershaft. Such a typical arrangement is shown in prior art reference U.S. Pat. No. 3,618,416, where torque delivery gears are journalled on a mainshaft and are arranged in constant mesh with countershaft gear elements. Synchronizer clutch assemblies are provided in the design of the '416 patent for selectively connecting each of the gears to the mainshaft to establish selectively the various drive ratios. The gears continuously rotate with respect to the mainshaft axis, even though only one of them is conditioned at any given time by its respective synchronizer clutch for torque delivery.

Another example of a parallel-shaft, constant-mesh, shiftable transmission with synchronizers mounted on the axis of the mainshaft is shown in prior art U.S. Pat. No. 3,994,182. This patent is distinguishable from the transmission of the '416 patent primarily by the construction of the countershaft gearing. In the case of the '416 patent, the countershaft includes independent cluster gears that rotate with and are connected to the countershaft itself; whereas the design of the '182 patent includes integral cluster gearing which is journalled on a fixed or "dead" mounting shaft. The mounting shaft, since it does not rotate, does not create inertia torque that is added to the inertia torque of the rotating countershaft gearing.

Synchronizer clutch assemblies for a double-shaft, constant-mesh, shiftable transmission may also be mounted on the axis of the countershaft rather than the common axis of the input and output shafts. An example of this construction is shown in prior art U.S. Pat. No. 4,757,726 where a synchronizer for the over-drive ratio is mounted on the countershaft and the synchronizers for the direct-drive ratio and three of the other forward drive ratios are mounted on the axis of the mainshaft.

Arrangements of this kind exhibit a tendency for the gears that are not functioning at any given instant in the torque flow path to produce an undesirable gear rattle. Gear rattle is induced by transient engine accelerations that are cyclic in nature. All driven rotary components of the transmission and the driveline components in the torque flow path downstream of the engine are affected by these angular accelerations. The extent to which they are effected depends upon the individual inertias of these components.

The magnitude of these acceleration effects depends also partly on the transmission gear ratio and the location of the individual components in the transmission or elsewhere in the driveline.

Gear rattle is discernible by the impacting of the gear teeth at each gear mesh in those torque flow paths that are inactive when the transmission is operated in any given ratio or when the transmission is operated in neutral.

Gear rattle is induced when the inertia torque of a component exceeds the drag torque acting on that component. If at any given gear mesh the inertia torques are sufficient to overcome the effect of frictional drag, including the viscous shear drag of the lubricating oil, a gear rattle is likely. Inertia torque is the product of angular acceleration and the inertia of the driven component.

During a ratio change in a synchronized transmission, a synchronizer sleeve in the synchronizer assembly exerts a force on a synchronizer blocker ring as chamfers on the blocker ring teeth engage chamfers on the internal teeth of the sleeve. The blocker ring in turn exerts a torque on the gear involved in the ratio change, causing the gear to accelerate until it approaches the angular velocity of the shaft on which it is mounted. The synchronizer blocker ring inhibits completion of the shifting of the sleeve until synchronization is achieved.

The gears that are in mesh with the gear being synchronized also must be accelerated or decelerated, as well as the other rotating parts of the transmission that rotate with the gear being synchronized. A reduced inertia for this rotating mass results in a reduced synchronizing force for effecting a ratio change and a shorter synchronizing time. This improves the shiftability.

We are aware of various prior attempts to overcome the gear rattle problem. Examples of prior art designs include transmissions that have brake members to provide a frictional drag on the gears. Thus, when the gears are inactive, a gear rattle will not occur as long as the frictional drag is above a threshold inertia torque at the gear mesh. This is an undesirable solution to the gear rattle problem because it contributes to the mechanical inefficiency in the transmission. It also has an undesirable effect on shiftability. A greater shift effort is required in the gear shift linkage if a parasitic drag is induced by the anti-rattle elements. This parasitic drag, when added to the effective inertia of the clutch and the related rotating components of the transmission, must be overcome by the operator as a shifting force is applied through the shift linkage to the synchronizer clutch assemblies.

We are aware also of other prior art attempts to eliminate the gear rattle problem by introducing a so-called scissor gear tooth arrangement in which one element of the meshing gearset is divided into two parts that are spring loaded torsionally, thereby eliminating a backlash condition at the conjugate meshing of the gear teeth. Still another example of an attempt to eliminate gear rattle is shown in prior art U.S. Pat. No. 4,811,615 where a torsional load is applied to adjacent elements of a countershaft gear so that the spring torque applied is of greater magnitude than the inertia torque at the meshing gear teeth. In this instance, the torsional spring load is capable of overcoming the torsional acceleration of the individual gears, provided the inertia torque does not exceed the spring torque. Aside from the functional limitations of these design arrangements, they add to the design complexity and cost and increase the space requirements for the gearing.

BRIEF DESCRIPTION OF THE INVENTION

Our improved multiple-shaft, constant-mesh, multiple-ratio transmission overcomes the shortcomings of prior art attempts to eliminate the gear rattle problem while contributing to an overall improvement in shiftability by reducing the various components of the total inertia torque. We have provided a transmission in which the elements of the gear train can be selectively decoupled from the torque input and output shafts of the transmission, thereby isolating those elements from transient torsional accelerations of the engine as well as from the rotating torque delivery elements on the torque output side of the transmission gearing.

In a conventional constant-mesh transmission of the kind described in the preceding paragraphs, only a single synchronizer clutch is used for each gearset. Thus, each gear pair is driven by either the input or the output. A separate gear pair is used for each torque flow path depending upon which synchronizer is selected by the vehicle operator. If the synchronizer is mounted on the output shaft as in the case of the '416 patent or the '182 patent, the gearing of the countershaft is always coupled to the engine and will be subjected to torsional disturbances of the engine. If the synchronizer is mounted on the countershaft, as in the case of the '726 patent, the gearset will be coupled to the output side of the transmission.

In our improved transmission, synchronizers form a part of each set of drive gearing on both the countershaft and the mainshaft. Thus, the gearing is not affected by torsional disturbances in the drive-line, regardless of whether the gearing is in the neutral condition or the transmission is conditioned for driving torque delivery.

In the embodiment disclosed in this specification, a dual synchronizer arrangement is used in the reverse gearing, although the same concept may be applied to any of the other gearsets in addition to the reverse gearset.

If both the input drive and the output drive are disconnected from the inactive gearing, the gears controlled by the dual synchronizer arrangement do not rotate. Thus, when the transmission is operating in a gear ratio other than reverse, the reverse gears and the reverse idler gear are inactive and rotate on their respective shafts at a reduced speed. This minimizes the problem of gear noise and heat generation and enhances the durability of the gears and the associated bearings, thus improving both the overall transmission durability and shiftability.

Torque pulses due to combustion forces or engine inertia torques have little or no effect on the individual gear elements in our improved transmission design since they are disconnected from the rotary members in those instances when they are isolated from the torque flow gearing.

Our improved transmission may be applied to a variety of engine and transmission configurations. In a typical configuration, a flywheel is used with the engine to reduce engine torsional acceleration. It is a known design practice to increase the mass of the flywheel in an attempt to reduce or to eliminate gear rattle. Our improved design, therefore, makes it unnecessary to increase flywheel mass.

For purposes of this disclosure, we have chosen to describe and illustrate a manual transmission with a single countershaft and with synchronizer clutches. Further, we have arranged the transmission input shaft in coaxial disposition with respect to the engine crankshaft. The principles of our invention, however, may be applied as well to parallel-shaft transmissions having two or more countershafts. Such parallel-shaft transmissions may be arranged with the shaft axes in alignment with or parallel to the engine crankshaft axis, but it is possible also to adapt our improved design for use in driveline installations in which the engine crankshaft axis is disposed, for example, transversely with respect to the shaft axes.

The particular embodiment of our invention that we have disclosed comprises a manual transmission with manually operated synchronizer clutches adapted to selectively establish and disestablish the multiple torque flow paths. The principles of our invention may be applied as well, however, to multiple shaft transmissions having fluid pressure actuated friction clutches or fluid pressure operated synchronizer clutches rather than the manually actuated synchronizer clutches of this disclosure. Such multiple shaft transmissions may have automatic or semi-automatic clutch controllers.

PARTICULAR DESCRIPTION OF THE INVENTION

The Gearing

Figure 1A:
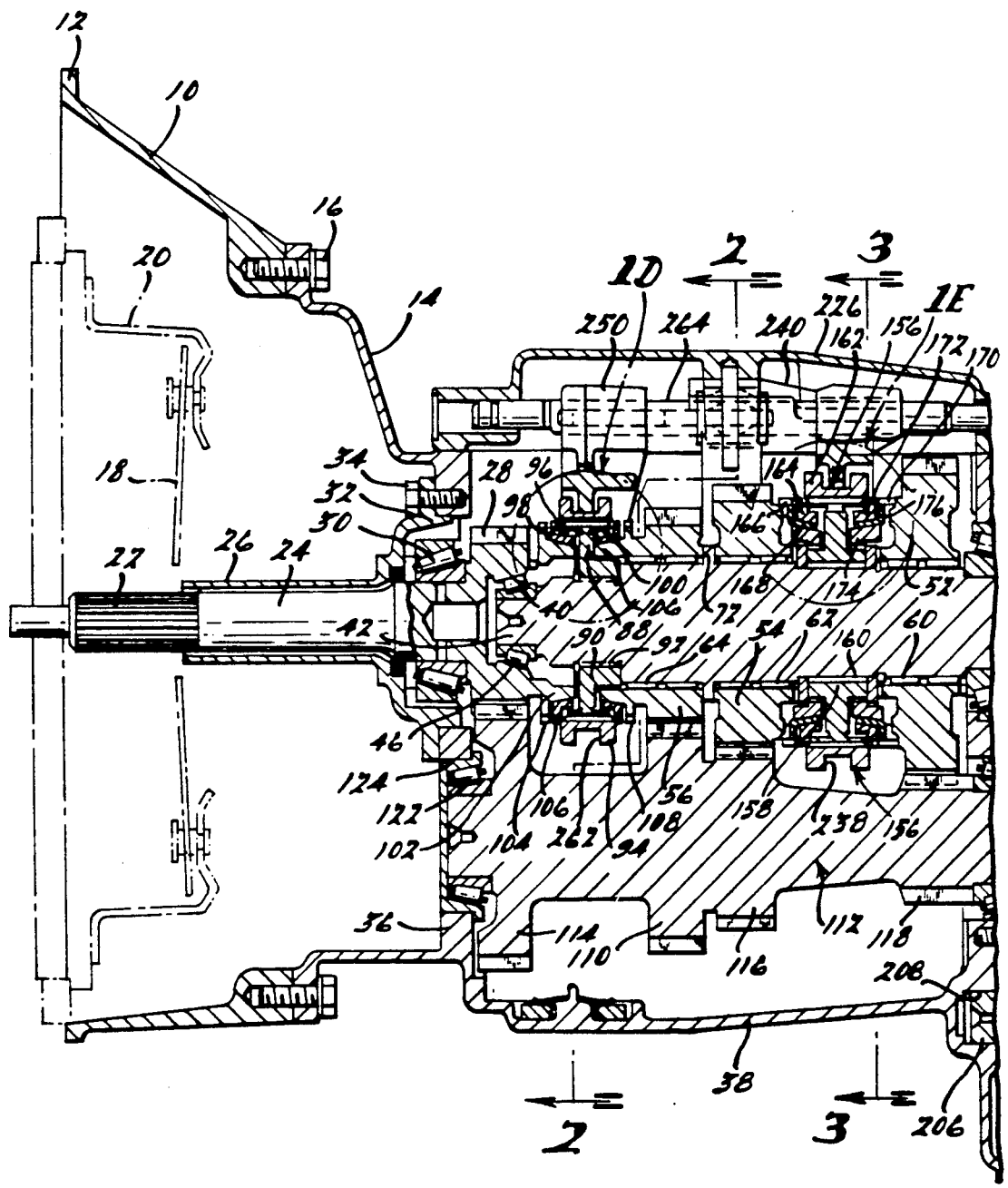
FIGS. 1A and 1B show a longitudinal cross-sectional view of the gearing elements of a multiple-ratio, manually shifted, constant-mesh, synchronized transmission embodying the features of our invention.

In FIG. 1A, reference numeral 10 designates a clutch housing which is bolted at its periphery 12 to an engine block for an engine (not shown). A transmission housing end portion 14 is secured by bolts 16 to the right side of the clutch housing 10. Also shown in FIG. 1 is a clutch apply spring 18, which forms a part of the starting clutch assembly (not shown).

The clutch cover shown in part at 20 is connected to the engine flywheel. The clutch assembly includes a clutch disc which is splined at 22 to torque input shaft 24 received in clutch bearing support sleeve 26.

Input shaft 24 is connected to or is formed integrally with torque input gear 28 journalled by a tapered roller bearing 30 located in bearing support 32. This bearing support is secured by bolts 34 to bearing support wall 36 at the left side of transmission main housing 38.

Input gear 28 is formed with a central bearing opening 40 which receives the left end 42 of a mainshaft 44. Torque output tailshaft 45 is connected to or is formed as a part of mainshaft 44. End 42 is journalled in the bearing opening 40 by tapered roller bearings 46. The right-hand end of the output shaft 44 is journalled by bearing 48 in a bearing opening formed in wall 50 of the transmission housing portion 38'.

Shaft 44 has journalled on it low speed ratio gear 52, second speed ratio gear 54, third speed ratio gear 56, and reverse gear 58. Each gear is journalled on the shaft 44 by a needle-bearing assembly shown respectively at 60, 62, 64 and 66. The fifth speed ratio gear 68 is splined to the shaft 44, as shown at 70.

Shaft 44 is formed with a reaction shoulder 72 for positioning gears 54 and 56.

An intermediate tapered roller bearing assembly 74 journals the intermediate portion of the shaft 44. It includes an inner bearing race which supports the shaft at 76 and an outer bearing race 78 which is supported by a bearing wall 80 of the main transmission housing 38. The inner bearing race for the tapered roller bearing assembly 74 is positioned against an annular shoulder 82 formed on the shaft 44. A snap ring 86 on the shaft 44 axially positions the fifth ratio gear 68.

A double-acting synchronizer assembly generally indicated at 88 is positioned between the input gear 28 and third speed ratio gear 56. It includes a synchronizer hub 90, which is splined at 92 to the left end of the shaft 44. Hub 90 carries a synchronizer clutch sleeve 94. Sleeve 94 and the hub 90 have registering splines that permits shifting movement of the sleeve 94 in either axial direction. Synchronizer thrust bars or struts 96 carried in axial slots in the periphery of the hub 90 are adapted, upon shifting movement of the sleeve 94, to engage synchronizer blocker ring 98 when the sleeve 94 is shifted in the left-hand direction. A companion synchronizer blocker ring 100 is engaged by the thrust bars 96 when the sleeve 9 is shifted in the right-hand direction.

The thrust bars 96 are urged radially outward by thrust bar springs 101 which surround the shaft 44 and establish a detent action between the thrust bars and the internal spline teeth of sleeve 94. The ends of the thrust bars are received in recesses 103 and 105 formed in blocker rings 98 and 100, respectively. The circumferential width of each of these blocker ring recesses is slightly greater than the width of the thrust bars.

Synchronizer blocker ring 98 has an internal cone surface that engages an external cone surface on clutch element 102 carried by gear 28. Clutch element 102 has external clutch teeth 104 which are engaged by the internal teeth of the sleeve 94 when the sleeve 94 is shifted through the external teeth 106 of the blocker ring 98.

If the sleeve 94 is shifted in the left-hand direction and a relative motion exists between gear 28 and the shaft 44, blocker ring 98 is indexed angularly to the extent permitted by a lost-motion connection between the blocker ring and the hub 90 that is formed by the thrust bars. This produces an interference between the teeth of the blocker ring and the internal teeth of the sleeve, thus causing clutching engagement of the cone clutch surfaces of the blocker ring and the clutch element 102. This imparts a synchronizing torque on the gear 28 which continues until synchronization between the gear 28 and the shaft 44 is achieved. After the motion of the gear 28 and the shaft 44 are synchronized, the sleeve 94 may be shifted into clutching engagement with the clutch teeth 104 of the gear 28.

Reference may be made to copending application Ser. No. 421,930, filed Oct. 16, 1989, for an understanding of the mode of operation of a synchronizer assembly of this kind. That application is assigned to the assignee of this invention.

When the sleeve 94 engages clutch teeth 104, a direct-driving connection is achieved between input shaft 24 and the shaft 44, thus establishing a one-to-one driving ratio, which is the fourth ratio.

If the sleeve 94 is shifted in a right-hand direction, blocker ring 100 establishes a synchronizing torque on clutch element 107 if relative motion exists between shaft 44 and gear 56. After synchronization is achieved, the sleeve 94 may engage teeth 108 of the clutch element 106 for the gear 56. This establishes a third speed ratio condition.

During operation in the third speed ratio, gear 56 delivers torque as it meshes with gear 110 on the cluster gear assembly 112. Input gear 28 meshes with gear 114 on the cluster gear assembly 112. Thus the torque flow path during third speed ratio operation includes gear 28, gear 114, gear 110 and gear 56.

The other gears that are carried by the shaft 44 are in constant mesh with companion gears on the cluster gear assembly 112. Gear 54 continuously meshes with gear 116 on the cluster gear assembly 112, gear 52 continuously meshes with gear 118, and gear 68 continuously meshes with gear 120.

The left-hand end of the cluster gear assembly 112 is journalled by a tapered roller bearing assembly 122 which has an outer race received in bearing opening 124 in the bearing support wall 36.

The right-hand end of the cluster gear assembly 112 is supported by roller bearing assembly 126 in bearing opening 128 formed in the end bearing support wall 50 of the housing 38. Bearing assembly 126 is primarily a pilot bearing with substantial radial tolerances. This avoids any bearing runout problems with respect to the other two clutch gear assembly support bearings.

Lubricating oil passage 138 distributes lubricating oil to radial passages 134 and 136 for lubricating needle bearing assemblies 140 and 142 for gear 120 and reverse gear 144.

The intermediate portion of the cluster gear assembly 112 is journalled by a tapered roller bearing 146 received in bearing opening 148 in bearing support wall 80 of the transmission main housing 38.

A bearing retainer plate 150 is secured by bolts 152 to bearing support wall 80, which maintains bearing assembly 146 in its axially fixed position. A similar bearing retainer plate 154 for bearing assembly 74 is secured to the bearing support wall 80.

The Synchronizers

A double-acting synchronizer clutch assembly 156 is located between gears 54 and 52. Synchronizer clutch assembly 156 includes a synchronizer hub 158 which is splined at 160 to the shaft 44. The clutch sleeve 162 is slidably supported on the hub 158 and is formed with internal spline teeth that engage external spline teeth on the hub 158.

A first blocker ring 164 is located between the hub 158 and clutch element 166 carried by gear 54. The synchronizer assembly 156 uses a double synchronizer cone clutch including clutch element 168 having radially outward and radially inward cone surfaces that engage cooperating cone surfaces on blocker ring 164 and synchronizer clutch element 167 connected to the hub 158. Upon shifting movement of the sleeve 162 in a left-hand direction, the blocker ring 164 impedes axial movement of the sleeve 162 until synchronization is achieved between shaft 44 and the gear 54. After synchronization is achieved, the internal clutch teeth of the sleeve 162 engage clutch teeth 166, thereby connecting the shaft 44 to the gear 54.

In a similar fashion, gear 52 can be connected to shaft 44 upon shifting movement of the sleeve 162 in a right-hand direction until its internal teeth engage the external clutch teeth 170 on the gear 52. A second blocker ring 172 is located on the right-hand side of the synchronizer clutch sub 158 between the sleeve 162 and the clutch element 170. As in the case of the synchronizer clutch for the gear 54, synchronizer clutch for the gear 52 is a double-cone synchronizer clutch assembly which includes a clutch element 174 connected to sub 158 as well as a double-cone clutch element 176 connected to the clutch element 170. The mode of operation of the double synchronizer clutch assembly for the gears 54 and 52 also may be readily understood by referring to copending patent application Ser. No. 421,930, filed Oct. 16, 1989.

Figure 1B:
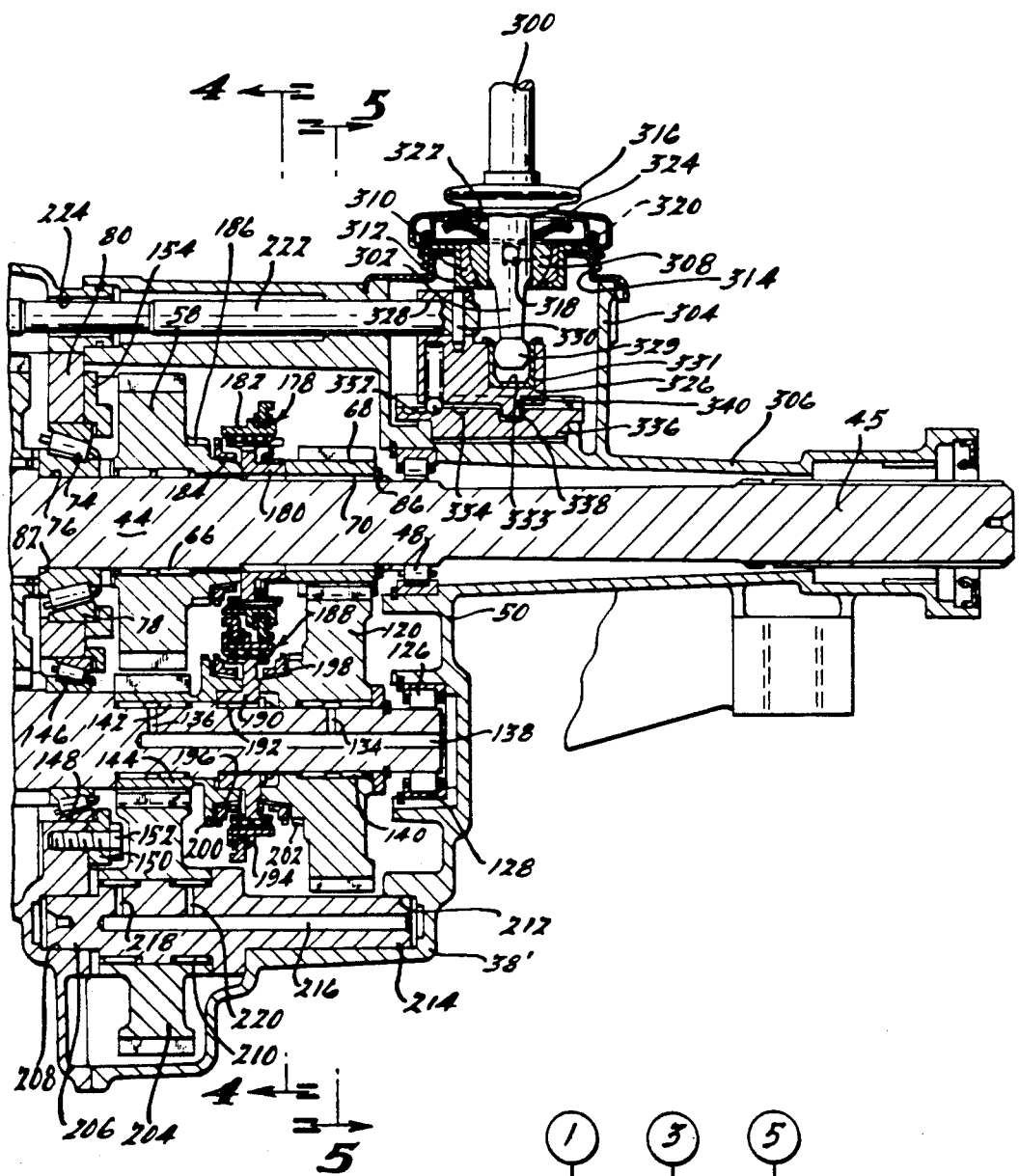
Figure 8:
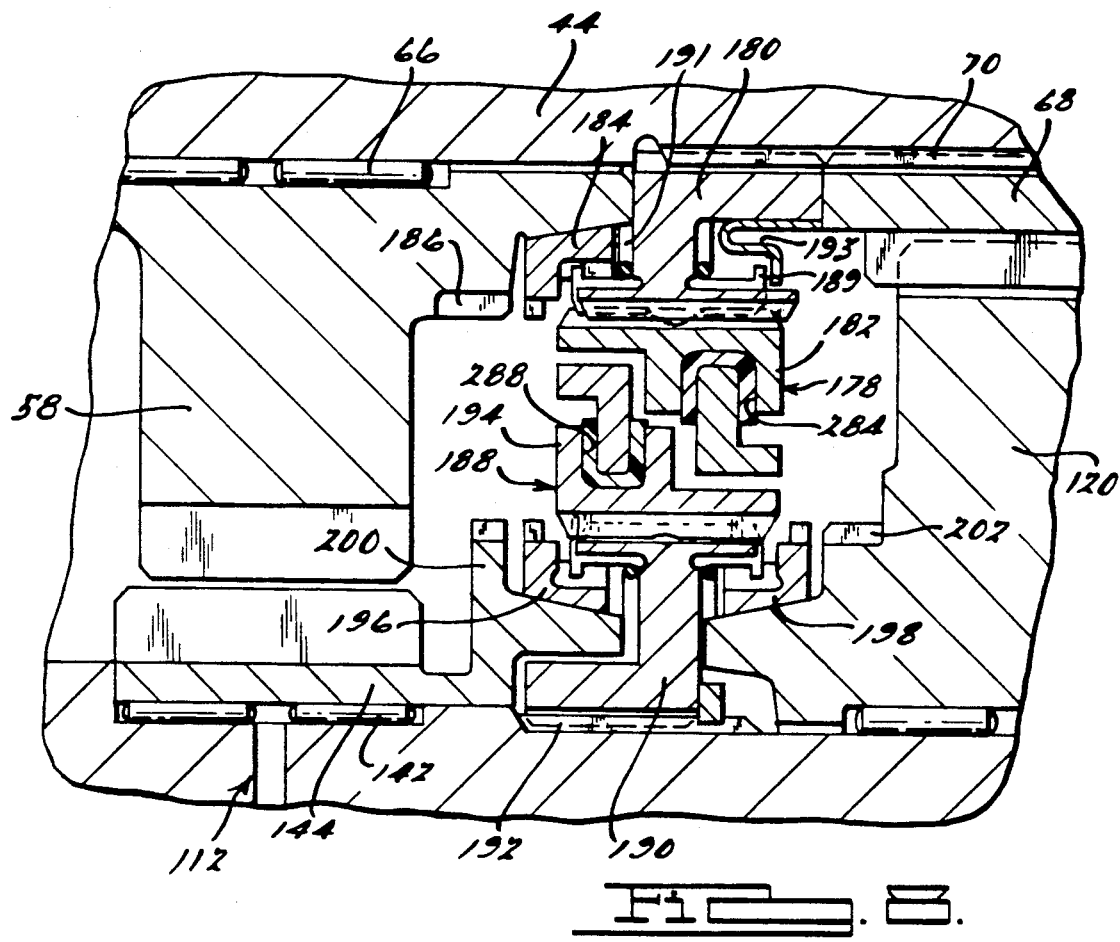
FIG. 8 is an enlarged partial cross-sectional view of the fifth-and-reverse shift fork.

A third synchronizer clutch assembly 178 is located between gear 58 and gear 68 and includes a hub 180 which is splined to the shaft 44 as seen in FIGS. 1B and 8. It is a single-acting synchronizer clutch assembly which includes synchronizer clutch sleeve 182 carried by the hub 180. As in the case of the other synchronizers described above, the sleeve and the hub are formed with cooperating clutch teeth. As the sleeve 182 is shifted in a left-hand direction, it develops a synchronizing clutch force on blocker ring 184 until synchronization is established between shaft 44 and the gear 58. After synchronization is established, sleeve 182 may be shifted through the blocker ring 184 into clutching engagement with clutch teeth 186.

A fourth synchronizer clutch assembly 188, seen also in FIGS. 1B and 8, is located between the reverse gear 144 and the fifth speed ratio gear 120 on the cluster gear assembly 112. It includes a synchronizer clutch hub 190 which is splined at 192 to the cluster gear assembly 112. Like the other synchronizer clutch assemblies, assembly 188 has thrust bars or struts 189 and radially acting thrust bar springs 191. Thrust bar retainer 193 carried by hub 180 holds the thrust bars in place.

Synchronizer clutch hub 190 slidably carries clutch sleeve 194, which is formed with internal teeth slidably engaging external teeth on the hub 190.

Synchronizer clutch assembly 188 is a double-acting synchronizer assembly which may be similar to the construction of the synchronizer clutch assembly 88. It includes a first blocker ring 196 on the left side of the hub 190 and a second blocker ring 198 on the opposite side. When the sleeve 194 is shifted in a left-hand direction, it engages blocker ring 196 until synchronization is achieved between the cluster gear assembly 112 and the gear 144. After synchronization is achieved, the sleeve 194 may be shifted into clutching engagement with external clutch teeth of the clutch element 200 carried by the gear 144.

Upon shifting movement of sleeve 194 in the right-hand direction, the internal teeth of the sleeve engage the teeth of blocker ring 198 until synchronization is established between gear 120 and cluster gear assembly 112. When synchronization occurs, sleeve 194 may pass through blocker ring 198, causing the internal teeth of the sleeve to engage teeth 202 carried by gear 120.

Figure 1C:
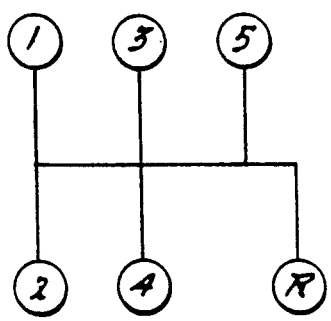
FIG. 1C shows the shift pattern for the gear shift linkage mechanism illustrated in FIG. 1.
Figure 1D:
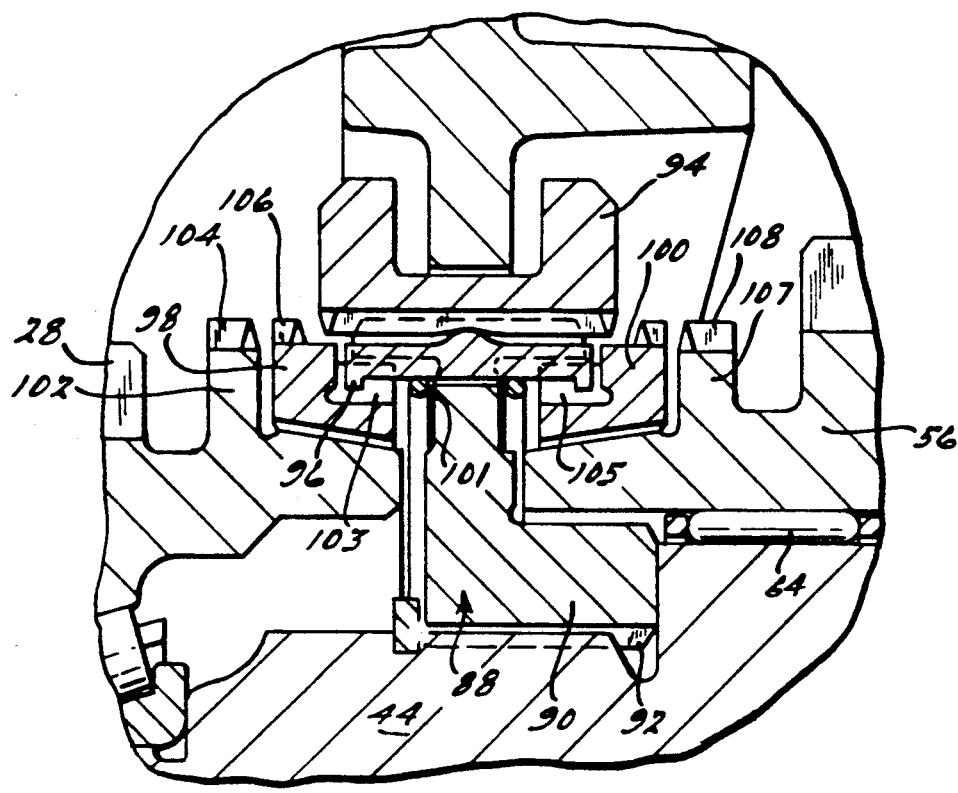
FIG. 1D is an enlarged view of the third and fourth ratio synchronizer clutch of FIG. 1A.
Figure 1E:
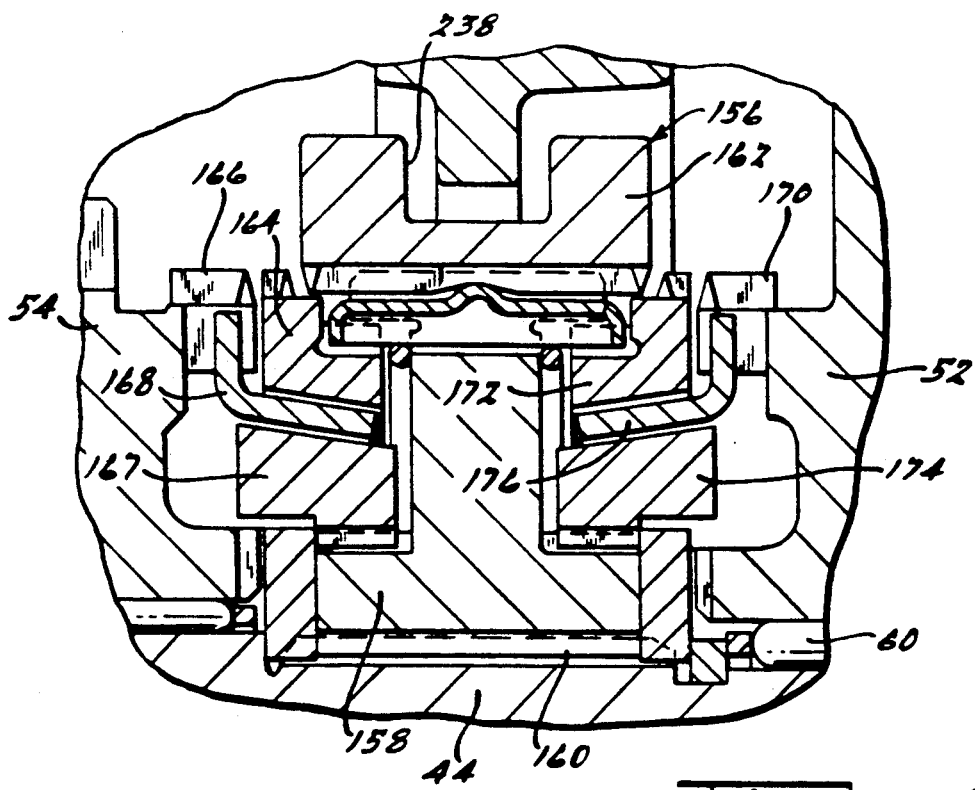
FIG. 1E is an enlarged view of the first and second ratio synchronizer clutch of FIG. 1A.

A reverse idler gear 204, as seen in FIG. 1C, is journalled on idler gear support shaft 206 by bearings 210. Support shaft 206 is supported at its left end in opening 208 formed in the transmission housing 38. The right-hand end of the shaft 206 is supported in bearing opening 212 in the housing portion 38', as shown at 214. Shaft 206 is formed with lubrication oil passage 216 which distributes lubricating oil to the bearing 210 through radial lubrication passages 218 and 220.

Ratio Changes

The lowest underdrive ratio is obtained by shifting synchronizer clutch sleeve 162 in a right-hand direction, thereby locking the gear 52 to the shaft 44. The cluster gear assembly 112 is continuously driven by the torque input gear 28. Thus, the torque flow path, during low speed ratio operation, includes the gears 28, 114, 118, 52 and the mainshaft 44.

A ratio change to the second underdrive ratio is achieved by shifting the synchronizer sleeve 162 in the left-hand direction until a driving connection is established between shaft 44 and gear 54. The torque flow path for transferring driving torque to the output side of the transmission then includes gear 28, gear 114, gear 116 and gear 54.

A ratio change to the third speed ratio is achieved, as explained previously, by shifting the shift sleeve 94 in the right-hand direction to lock the gear 56 to the shaft 44.

Fourth speed ratio, which is a direct-drive ratio, is achieved, as explained previously, by shifting the synchronizer clutch sleeve 94 in the left-hand direction until sleeve 94 becomes clutched directly to the gear 28.

The fifth speed ratio is achieved by shifting the clutch sleeve 194 for the synchronizer clutch assembly 188 in a right-hand direction until the cluster gear assembly 112 is connected directly to the fifth speed ratio gear 120. Thus, during the fifth speed ratio operation, the torque flow path includes gear 28, gear 114, gear 120, and gear 68.

Reverse drive is achieved by shifting the clutch sleeve 194 in the left-hand direction until the cluster gear assembly 112 is connected directly to the reverse gear 144 and by shifting clutch sleeve 182 in the left-hand direction until it is connected to reverse gear 58. Reverse idler gear 204 meshes continuously with reverse gear 58 and reverse gear 144 so that the torque flow path during reverse drive includes gear 28, gear 114, gear 144, reverse idler gear 204 and reverse gear 58.

Sleeve 182 of synchronizer clutch assembly 178 is located axially so that when it is shifted, together with shifting movement of sleeve 194 of synchronizer clutch assembly 188, it engages the clutch teeth 186 before the blocker ring 196 of synchronizer clutch assembly 188 is engaged by the synchronizer sleeve 194.

Although the embodiment of the invention disclosed in this specification has two sequentially acting synchronizer clutch assemblies 178 and 188, the principles of our invention may be applied as well to a multiple shaft transmission of this type wherein one of the synchronizer clutch assemblies 178 or 188 is replaced with a sliding sleeve clutch. U.S. Pat. No. 3,618,416, which was described earlier, shows an example of a typical sleeve clutch of the kind that might be adapted to be used with our invention. See, for example, sleeve clutch 28 and gear 34 in FIG. 1 of U.S. Pat. No. 3,618,416.

It is apparent from the foregoing description that gear 58 is completely disconnected from the torque flow path during operation in any of the forward driving ratios. It is clutched into engagement with shaft 44 only during reverse drive. Similarly, reverse gear 144 is completely disconnected from the cluster gear assembly 112 during operation in all ratios except for the reverse drive ratio. Thus, gear 144 and reverse idler gear 204 with which it meshes, do not rotate during operation of the transmission in the forward driving ratios. Parasitic drag losses at the gear journal bearings, however, may cause a small amount of rotation of gears 144 and 58 and idler gear 204. The rotating mass of the idler gear 204, the rotating mass of the reverse gear 144, and the rotating mass of the gear 58 do not add to the driven inertia of the rotating inertia masses that must be accelerated or decelerated during ratio changes.

The fifth ratio gear 120 is disconnected from the countershaft 112 during operation in any ratio except the fifth ratio and, therefore, is isolated from the engine torsional accelerations. Although gear 68 is in continuous meshing engagement with the gear 120 and the gear 120 adds to the rotating inertia mass during operation in the other ratios, the rotating inertia mass of the cluster gear assembly and the rotating mass of the gear 120 are not additive during such operation in the other ratios.

Gear 68 and gear 120 with which it meshes are driven by the vehicle wheels during operation in all gear ratios other than fifth gear ratio. The rotating inertia mass of gears 68 and 120 is not a factor, therefore, that affects shiftability during shifts between the ratios for the first four forward drives and reverse. Neither is it a factor that affects gear rattle because the synchronizer clutch assembly 188 disconnects gear 120 from the clutch gear assembly and isolates gear 120 from engine torsional accelerations that create gear rattle. The gear 120 is journalled at 140 on clutch gear assembly 112, and any viscous shear drag at the bearing 140 due to the relative motion of gear 120 and the cluster gear assembly is not significant enough to affect either shiftability or gear rattle.

Ratio Selection

Shifting movement of the respective synchronizer clutch sleeves is achieved by the single shift rail 222 located at the top of the assembly shown in FIGS. 1A and 1B. Shift rail 222 extends through opening 224 in a shift rail cover secured to the top of the transmission housing, the cover being designated by reference numeral 226.

Figure 3:
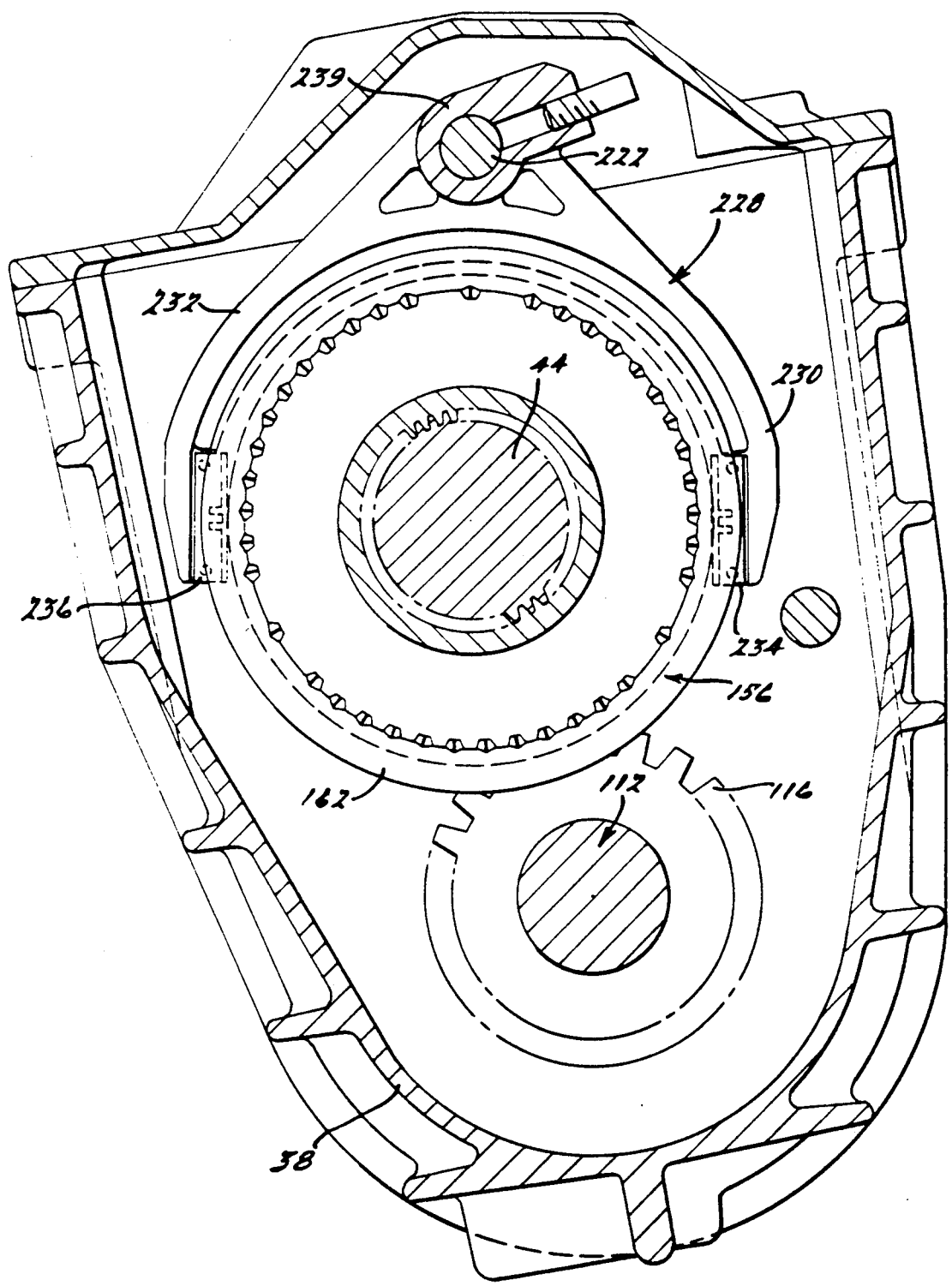
FIG. 3 is a cross-sectional view taken along the plane of section line 3—3 of FIG. 1A.

As seen in FIG. 3, the shift rail 222 carries a shift fork assembly 228 having shift fork legs 230 and 232. The ends of the legs carry shift fork pads 234 and 236 which are received in shift rail fork groove 238 in the sleeve 162 of the 1-2 synchronizer clutch assembly 156.

The shift fork assembly includes a selector fork body 239 which surrounds the shift rail 222. The selector fork body includes a 1-2 shift plate shown in FIGS. 1A and 6 at 240. Shift plate 240 is provided with a slot, shown in FIG. 6 at 242, which is engaged by selector pin 244 carried by selector pin body 246. Body 246 is secured to the shift rail 222 by a pin 248 so that the selector body 246 and the shift rail 222 rotate in unison and shift axially in unison.

When the selector pin 244 is rotated in a counterclockwise direction, it engages the slot 242. Subsequent axial movement of the shift rail 222 then will cause the shift plate 240 and the selector fork body 239 to shift in unison with the shift rail. This imparts a shifting motion to the synchronizer clutch sleeve 162 in one direction or the other, depending upon the shifting direction of the shift rail 222.

Figure 2:
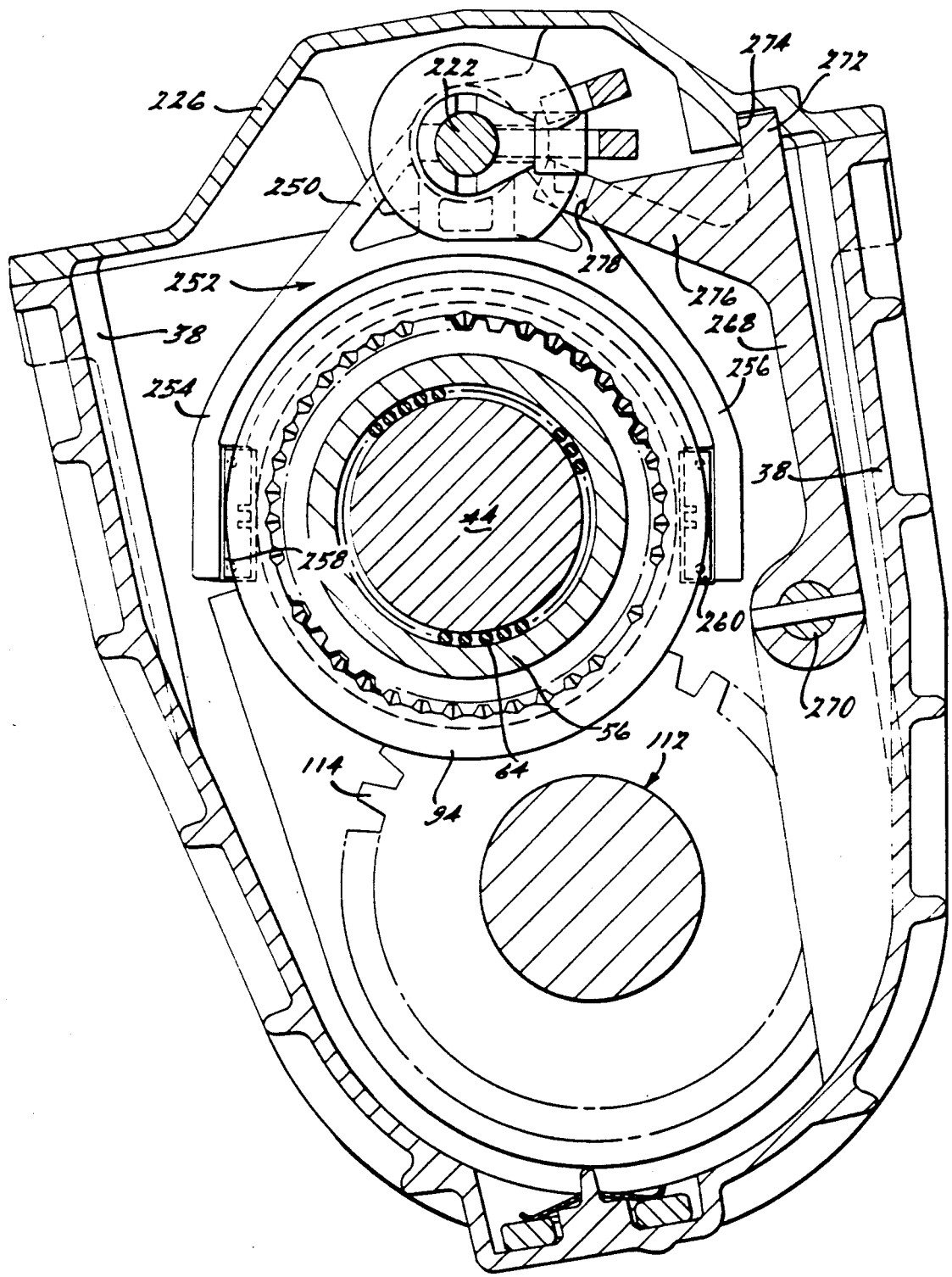
FIG. 2 is a cross-sectional view taken along the plane of section line 2—2 of FIG. 1.

Shift rail 222 also supports a clutch fork body 250 for the 3-4 shift fork assembly 252, seen best in FIGS. 1A and 2.

Shift fork assembly 252 includes shift fork legs 254 and 256 which carry at their ends, respectively, shift fork pads 258, 260, as seen in FIG. 2. These pads 258 and 260 register with synchronizer clutch sleeve groove 262 formed in the synchronizer clutch sleeve 94.

Figure 6:
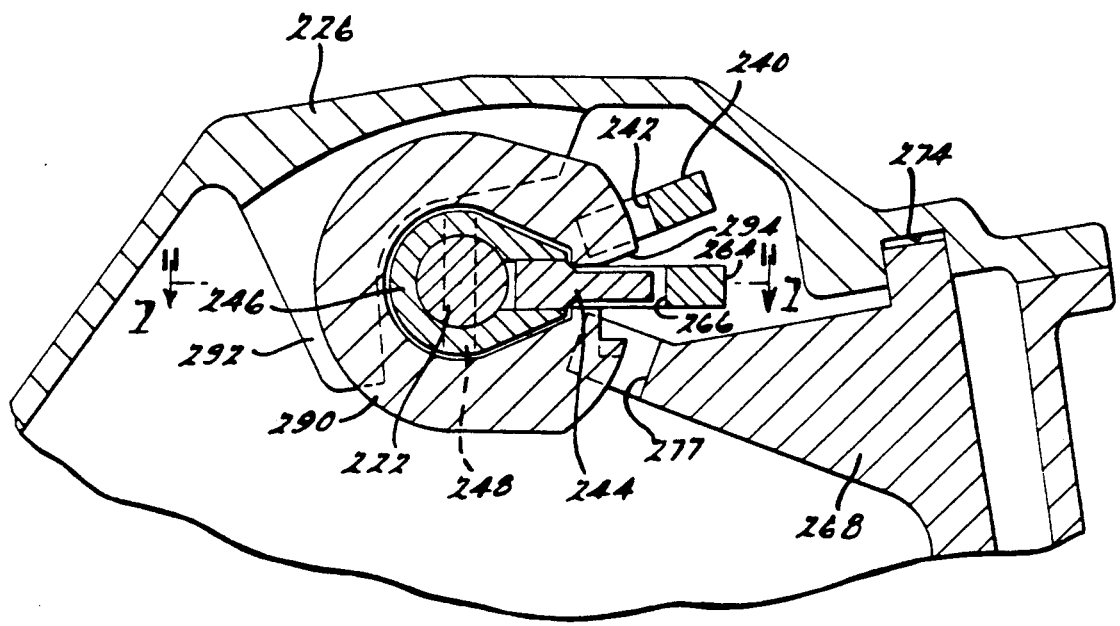
FIG. 6 is an enlarged cross-sectional view of the shift rail and selector body assembly for the 1-2 shift linkage, the 3-4 shift linkage, and the fifth-and-reverse shift linkage.
Figure 7:
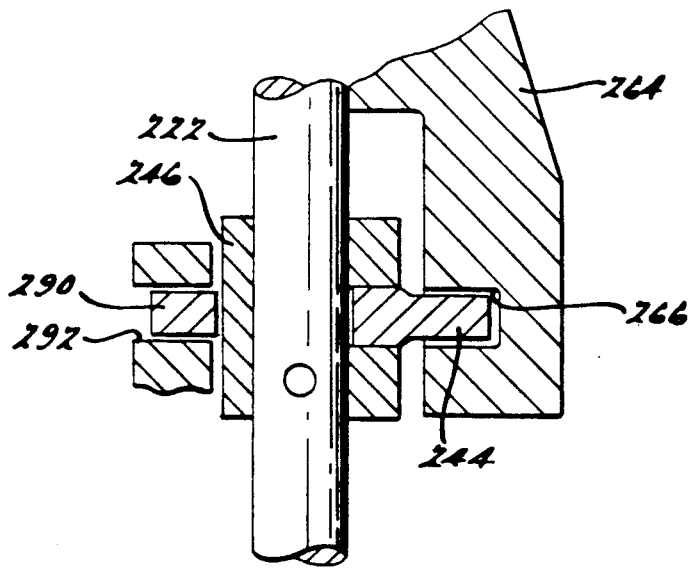
FIG. 7 is a cross-sectional view taken along the plane of section line 7—7 of FIG. 6.

The fork body 250 carries 3-4 shift plate 264, as seen best in FIGS. 1A and 7. When the shift rail 222 is rotated so that the selector pin 244 is in a generally horizontal direction as viewed in FIG. 6, the selector pin 244 registers with slot 266 in the shift plate 264. If the shift rail is moved axially after the 3-4 shift plate is engaged by the selector pin, the synchronizer clutch sleeve 94 will be shifted axially in one direction or the other depending upon the direction of the axial shifting movement of the shift rail 222.

FIGS. 2 and 6 show a fifth-and-reverse lever 268. The fifth-and-reverse lever 268 is supported by and pinned to support shaft 270, seen in FIGS. 2 and 4, which extends in a direction parallel to the axes of the shaft 44 and the cluster gear assembly 112. It is end supported in bosses formed in the transmission housing 38. The upper end of the fifth-and-reverse lever, as shown at 272 in FIG. 2, is received in opening 274 formed in the cover 226.

The fifth-and-reverse lever 268, as seen in FIGS. 2 and 6, has an arm 276 which has a recess 278 engaged by selector pin 244 when the selector pin is rotated clockwise from the position shown in FIG. 6. When the selector pin assumes that angular position and when the shift rail 222 is shifted axially, the fifth-and-reverse lever 268 is shifted in one direction or the other depending on the direction of the shifting movement of the shift rail 222.

Figure 4:
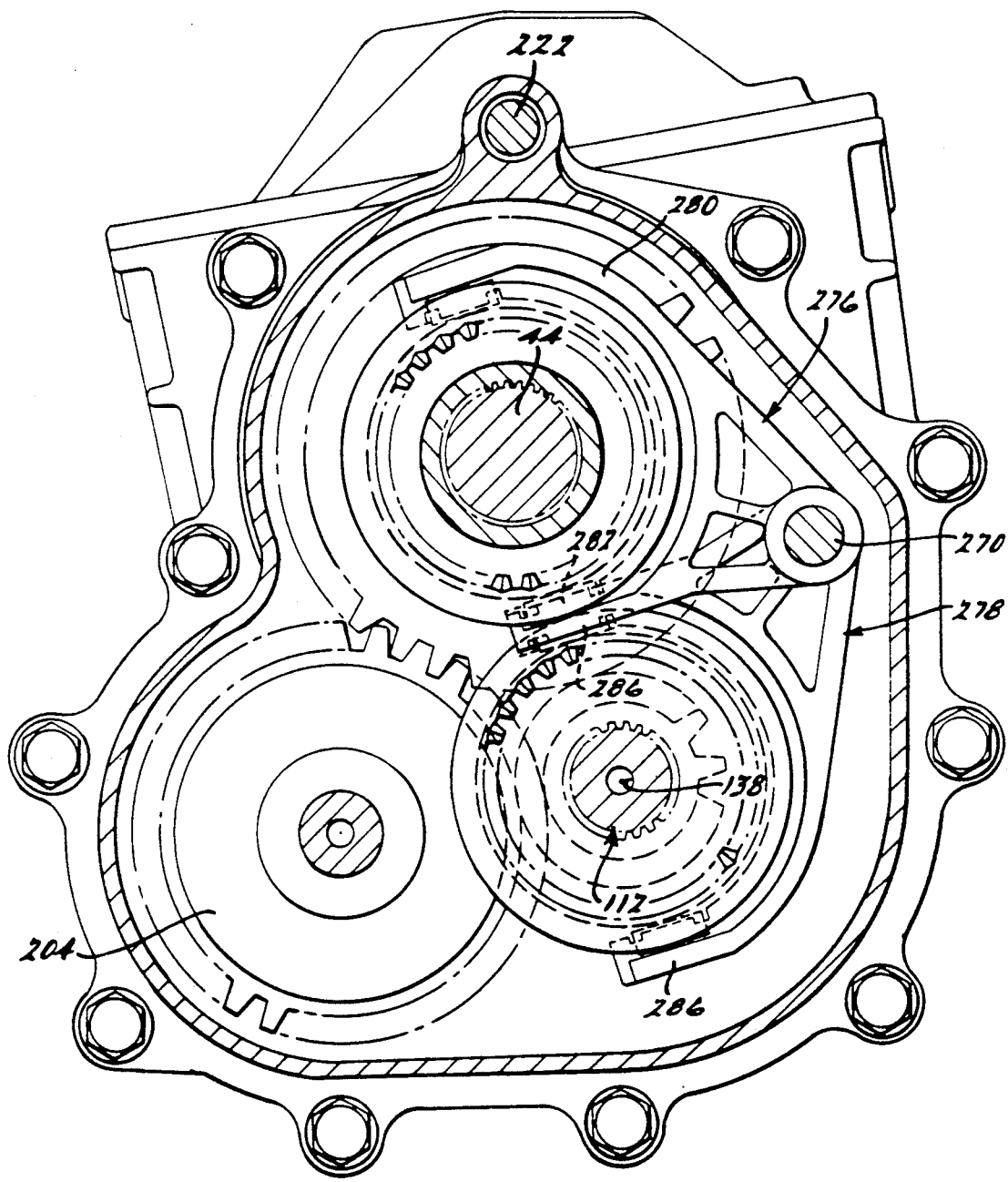
FIG. 4 is a cross-sectional view taken along the plane of section line 4—4 of FIG. 1B.
Figure 5:
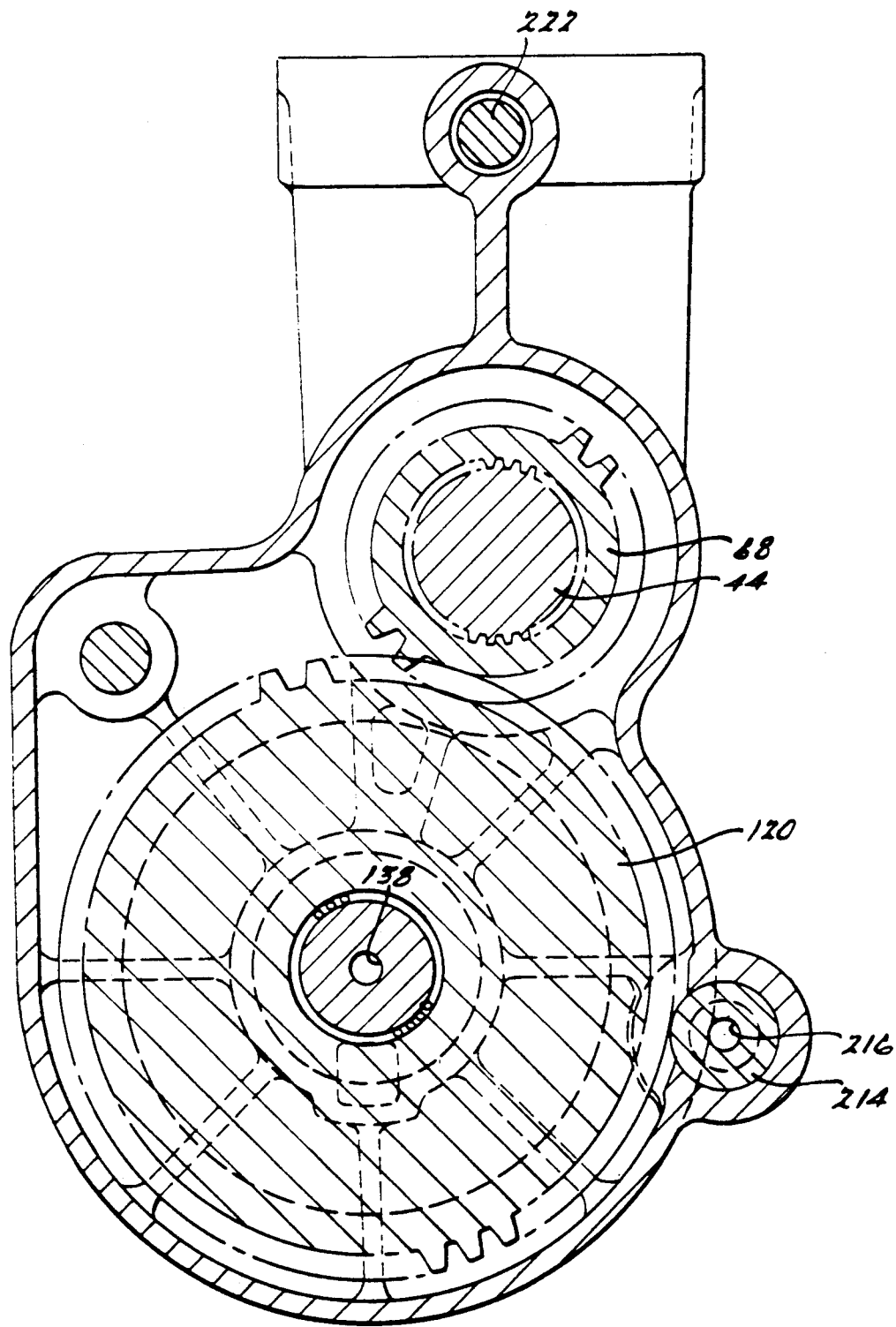
FIG. 5 is a cross-sectional view taken along the plane of section line 5—5 of FIG. 1B.

As seen best in FIG. 4, the shaft 270 supports both the reverse shift fork assembly 276 and the fifth-and-reverse shift fork assembly 278. Shift fork assembly 276 includes shift fork legs 280 and 282 which carry shift fork pads that engage the reverse synchronizer sleeve groove 284, best seen in FIG. 8. The fork assembly 278 includes a pair of legs 286 which register with shift fork groove 288, best seen in FIG. 8, formed in the synchronizer clutch sleeve 194.

Referring next to FIGS. 6 and 7, it is seen that the shift rail 222 rotatably supports an interlock plate 290. Plate 290 is not secured to the shaft 222, but it is supported by it. Interlock plate 290 is received in a slot 292 formed in the cover 226. Thus, the interlock plate is held axially fast with respect to the cover 226, but it may rotate with respect to it as the pin 244 is rotated by the shaft 222.

The interlock plate has a side opening 294 through which the pin 244 extends. The pin 244 and the interlock plate, when pin 244 is in the position shown in FIG. 6, are in the same plane so that when the pin rotates, the interlock plate rotates with it.

When the selector pin 244 assumes the horizontal position shown in FIG. 6, the interlock plate 290 is received in slot 242 of the 1-2 shift plate 240. This holds the 1-2 shift plate axially fast as the selector pin 244 is adapted to shift the 3-4 shift plate 264 in either axial direction. Similarly, the interlock plate engages slot 277 of the fifth-and-reverse lever 268 when the pin assumes the horizontal position shown in FIG. 6. This locks the fifth-and-reverse lever 268 against shifting movement in the direction of the axis of the shift rail 222 when the shift rail is shifted in either axial direction.

Similarly, if the pin 244 is rotated in a counterclockwise direction from the position shown in FIG. 6, it engages the slot 242 in the 1-2 shift plate 240. At that time, the interlock plate locks the fifth-and-reverse lever 168 and the 3-4 shift plate to the cover 226 against axial movement as the shift rail 222 is shifted in one axial direction or the other. In a similar fashion, when the pin 244 is shifted in a clockwise direction to engage the fifth-and-reverse lever slot 277, the interlock plate will engage slots 242 and 266 in the 1-2 shift plate and the 3-4 shift plate, respectively, thereby locking the 1-2 shift fork and the 3-4 shift fork axially fast with respect to the cover 226 during axial shifting motion of the shift rail 222.

FIG. 7 shows the pin 244 engaged in the slot 266 of the 3-4 shift plate. This relationship between the 3-4 shift plate and the pin 244 is typical of the manner in which the interlock plate functions with respect to the other synchronizer clutch sleeves.

FIG. 8 shows in detail cross-section the ends of the fifth-and-reverse shift fork and the reverse shift fork. As seen in FIG. 8, these fork ends are offset axially, one with respect to the other to avoid interference.

Figure 9:
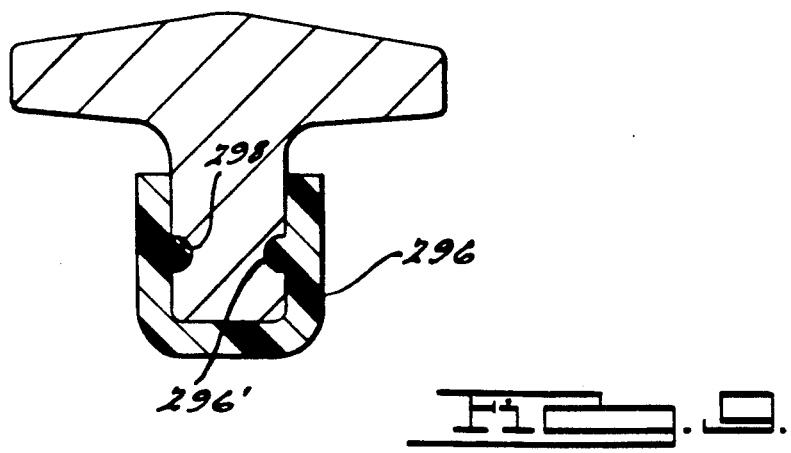
FIG. 9 is a cross-sectional view of the end detail of a typical leg for a shift fork.

FIG. 9 is a detailed cross-sectional view of one end of a typical shift fork. Each shift fork includes a nylon pad 296 surrounding the end of the shift fork leg. This pad registers with the groove formed in the respective synchronizer clutch sleeves. The nylon pad is held in place by protrusions 296' received in dimple openings 298.

The shift rail is actuated rotatably and axially by a shift cane or shift lever 300, as seen in FIG. 1B. The lower end 302 of the shift lever 300 is received in the shift lever tower 304, which is formed on the transmission tailshaft housing 306. The lower end of the shift lever 300 is received in a spherical bearing member 308, which is piloted in a registering bearing element 310 having an internal spherical bearing surface. Bearing element 310 is supported by a support plate 312 received in an opening in closure member 314, which rests on and is secured to the top of the tower 304. A flexible boot seal 316 surrounds the top of the member 314 and the lower end of the lever 300.

A retainer pin 318 extends through a transverse slot 320 in the lower end 302 of the shift lever 300 and through a cooperating opening formed in the bearing 308. A leaf spring assembly 322 exerts a spring force on the pin 318, tending normally to maintain registry of the bearing members 308 and 310. Spring assembly 322 is anchored on a retainer ring 324 secured at its margin to the member 312. The bearing members serve as a fulcrum for the shift lever 300 as the shift lever is moved in a direction parallel to the plane of the axis of the shaft 44.

The lower end 302 of the shift lever 300 has a ball-and-socket connection with shift member 326. This connection includes a ball 329 formed on the end 302 and a bearing socket 331 received in a cylindrical opening 333 in the member 326.

Member 326 is connected to the shift rail 222. This connection and is effected by a cylindrical opening 328 in the member 326 through which the end of the shift rail 222 extends. A retainer pin 330 locks the shift rail to the member 326. Thus, when the shift lever 300 is moved fore-and-aft in the direction of the plane of the shaft 44, the shift rail 222 is shifted axially in one direction or the other as it follows the motion of the member 326.

A spring-loaded detent ball 332 is carried by the member 326. It engages detent recesses 334 in detent plate 336, which is supported as shown in FIG. 1 on the tailshaft extension housing within the tower 304.

Member 326 has a guide element 338 received in a pattern of grooves 340 in the detent plate 336. The grooves include axially extending portions and transversely extending portions for controlling the pattern of motion of the member 326 as the shift lever 300 is moved from one shift ratio position to another. This pattern is illustrated in FIG. 1C. The first, the third and the fifth speed ratio positions for the member 326 are obtained by moving the shift lever 300 in a direction perpendicular to the plane of shaft 44.

Having been positioned in that plane, the shift lever 300 then may be oscillated in a direction parallel to the plane of the shaft 44 to select the first or the third or the fifth ratio position. In a similar fashion, the second, fourth and reverse positions for the member 326 ar obtained by rotating the shift lever 300 in the opposite direction in a plane perpendicular to the axis of shaft 44. Subsequent shifting movement of the shift lever 300 in a direction parallel to the plane of the axis of shaft 44 then will result in selection of the second, fourth or reverse positions.

This rotary motion and axial motion of the member 326 is transferred to the shift rail 222. Rotary motion of the shift rail 222 will result in selection of the 1-2 shift plate, the 3-4 shift plate or the fifth-and-reverse shift lever illustrated in FIG. 6 as the selector pin 244 rotates into and out of engagement with respect to the slots 242, 266 and 278. After the 1-2 shift plate, the 3-4 shift plate, or the fifth-and-reverse shift lever has been selected, axial shifting movement of the shift rail will result in shifting movement of the synchronizing clutch sleeves 94, 162 or 182 associated with the 3-4 shift plate, the 1-2 shift plate and the fifth-and-reverse shift lever, respectively.

As explained previously, movement of the fifth-and-reverse shift lever will result in simultaneous movement of the synchronizer clutch sleeves 182 and 194.

Overview

The gears that comprise the torque flow path during reverse drive are completely disassociated from the shafts upon which they are journalled and do not contribute to the rotary inertia mass. Further, during operation in a ratio other than the fifth over-drive ratio, the overdrive gear 120 is disconnected from the countershaft assembly 112. Although the overdrive gear is connected to gear 68 which in turn in splined to the shaft 44 and rotates with the shaft 44, the rotary inertia mass of the gear 120 is not added to the inertia mass of the countershaft assembly 112 or the other rotary elements of the transmission.

Since the gears 58, 204 and 144 can rotate freely on their respective bearings and are not called upon to rotate with the other rotary elements of the transmission during operation in the forward drive ranges, no gear rattle is developed at any of the multiple meshes in the gearing for the reverse drive train. Thus, transmission noise is substantially reduced. Further, shiftability during ratio changes does not deteriorate because the inactive gearing elements do not provide additional rotary mass in the reverse drive torque flow path. These gearing elements are decoupled and isolated from both the input side and the output side of the transmission, thereby avoiding torsional vibrations that would otherwise result from torsional accelerations.

When the transmission mechanism is not operating in reverse, the relative speeds of the reverse gears and the reverse pinion with respect to the shifts upon which they are mounted is reduced. Thus, less heat is generated due to mechanical friction and lubricating oil torque losses. This will increase the useful life of the reverse blocker ring and the bearings for the reverse gears and the reverse idler gear. This is an advantage of our improved design that is in addition to the anti-gear rattle feature and the improved shiftability discussed earlier.

Although the gears that define the torque flow paths for the first four forward driving ratios are constant-mesh gears wherein only one of the gear elements of each meshing pair is journalled on its respective shaft, we contemplate that the design considerations described in this specification for the reverse torque flow path could be applied as well to these forward driving ratios. For example, the gear elements 110, 116 and 118 could be mounted rotatably on a countershaft, and independent synchronizing clutch assemblies similar to the one described with reference to gears 56, 54 and 52 could be used to selectively clutch the gears 110, 116 and 118 to the countershaft. Each gear of each gear mesh then would be capable of freewheeling relative to the shaft upon which it is mounted, thus isolating the driveline from the inertia torque that would be developed by the rotating mass of these gears. Shiftability thus is improved. Also, any tendency for these gears to develop a gear rattle noise would be eliminated for the same reasons that the gear rattle condition is eliminated in the gear elements that define the reverse drive torque flow path.

Having described a preferred embodiment of our invention, what we claim and desire to secure by United States Letters Patent is:

1. In a multiple-shaft, constant-mesh transmission adapted to establish selectively a reverse torque delivery path and a forward drive torque delivery path and having a torque input means including a torque input shaft (24), a mainshaft (44) aligned with said input shaft, a countershaft (112) geared to said input shaft in spaced, parallel relationship with respect to said mainshaft (44), a torque output shaft (45) joined to said mainshaft;
   multiple mainshaft gear elements journalled on said mainshaft, multiple cluster gear elements carried by said countershaft in meshing engagement with said mainshaft gear elements, one of said cluster gear elements (120) being rotatably journalled on said countershaft;
   a reverse idle gear (204), a reverse gear (144) journalled on said countershaft (112), said reverse idler gear (204) being in constant mesh with said reverse gear (144) and one of said mainshaft gear elements (58);
   first clutch means (188) for connecting selectively said reverse gear (144) and said countershaft (112);
   second synchronizer clutch means (178) for connecting selectively said one of said mainshaft gear elements (58) to said mainshaft; and
   third synchronizer clutch means (88, 100) for selectively connecting another of said mainshaft gear elements (56) to said mainshaft;
   said first clutch means being a double-acting clutch with a first common axially movable clutch element adapted upon movement in one axial direction to drivably connected said reverse gear (144) to said countershaft (112) and adapted upon movement in the opposite axial direction to connect said one cluster gear element (120) to said countershaft;
   said second synchronizer clutch means (178) having a second common axially movable clutch element adapted upon movement in one axial direction to connect said one of said mainshaft gear elements (58) to said mainshaft and adapted upon movement in the opposite direction to connect a third of said mainshaft gear elements (68) to said mainshaft whereby said reverse drive torque delivery path is deactivated when said forward drive torque delivery path is activated.

2. In a multiple-shaft, constant-mesh transmission having a torque input shaft (24), a mainshaft (44) aligned with said input shaft, a countershaft (112) in spaced, parallel relationship with respect to said mainshaft, a geared connection between said input shaft and said countershaft, a torque output shaft joined to said mainshaft;
   multiple mainshaft gear elements (56, 54, 52, 58) journalled on said mainshaft, multiple cluster gear elements (110, 116, 118) carried by said countershaft, each of said multiple cluster gear elements meshing with a separate one of said mainshaft gear elements (56, 54, 52);
   a reverse idler gear (204), a reverse gear (144) journalled on said countershaft, said reverse idler gear being in constant mesh with said reverse gear (144) and a first additional mainshaft gear element (58);
   first clutch means (188) for connecting selectively said reverse gear (144) and said countershaft (112);
   second clutch means (178) for connecting selectively said additional mainshaft gear element (58) to said mainshaft (44), said additional mainshaft gear element meshing with said reverse idler gear (204);
   third clutch means (88) for selectively connecting one of said multiple mainshaft gear elements (56) to said mainshaft (44);
   a first high speed ratio gear element (120) rotatably carried by said countershaft, a second additional mainshaft gear element (68) secured to said mainshaft in meshing engagement with said first high speed ratio gear element, said first clutch means (188) being a double-acting synchronizer and having clutch sleeve teeth, said first high speed ratio gear element (120) and said reverse gear (144) having clutch sleeve teeth upon shifting movement thereof; said second clutch means being double acting and having clutch teeth on a common clutch element adapted to connect said additional mainshaft gear element (58) to said mainshaft (44) upon movement in one axial direction and adapted to connect said second additional mainshaft gear element to said mainshaft upon movement in the opposite axial direction.

3. The combination as set forth in claim 1 wherein said torque input means includes a torque input gear

(28) connected to said input shaft, a torque input countershaft gear element (114) on said countershaft (112) meshing with said torque input gear.

4. The combination as set forth in claim 2 wherein said geared connection and said first high speed ratio gear element (120) are located on opposite sides of said reverse gear (144) adjacent opposite ends of said countershaft (112).

5. The combination as set forth in claim 3 wherein said torque input means and said first high speed ratio gear element (120) are located on opposite sides of said reverse gear (144) adjacent opposite ends of said countershaft (112).

* * * * *

UNITED STATES PATENT AND TRADEMARK OFFICE
CERTIFICATE OF CORRECTION

PATENT NO. : 5,105,674

DATED : April 21, 1992

INVENTOR(S) : Jeffrey E. Rea; Danni D. Mills; John S. Sewell

It is certified that error appears in the above-identified patent and that said Letters Patent is hereby corrected as shown below:

Abstract, line 10 delete "driven" and insert --drives--.

Column 5, line 41 after "sleeve" delete "9" and substitute --94--.

Column 11, line 36 delete "groove" and insert --grooves-.

Column 12, line 28 delete "ar" and insert --are--.

Column 14, lines 58-59 after "clutch" insert --teeth adapted to register selectively with said clutch--.

Signed and Sealed this

Third Day of August, 1993

Attest:

MICHAEL K. KIRK

*Attesting Officer*     Acting Commissioner of Patents and Trademarks